(12) United States Patent
Muzzo et al.

(10) Patent No.: US 12,321,460 B2
(45) Date of Patent: Jun. 3, 2025

(54) DISTRIBUTED SECURE CONTENT INSPECTION IN ENTERPRISE NETWORKS

(71) Applicant: Bank of America Corporation, Charlotte, NC (US)

(72) Inventors: Ryan Muzzo, Saint Charles, FL (US); David Patrick Harte, Camberley (GB); Tommy W. Jinks, Stanley, NC (US); David Scott Strubbe, Waxhaw, NC (US); Les Varga, Tarzana, CA (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 17/479,080

(22) Filed: Sep. 20, 2021

(65) Prior Publication Data

US 2023/0087234 A1    Mar. 23, 2023

(51) Int. Cl.
| | | |
|---|---|---|
| *G06F 21/57* | (2013.01) | |
| *G06F 21/56* | (2013.01) | |
| *G06F 21/60* | (2013.01) | |
| *G06F 21/74* | (2013.01) | |
| *G06F 21/85* | (2013.01) | |
| *H04L 12/46* | (2006.01) | |

(52) U.S. Cl.
CPC .......... *G06F 21/577* (2013.01); *G06F 21/565* (2013.01); *G06F 21/568* (2013.01); *G06F 21/602* (2013.01); *G06F 21/74* (2013.01); *G06F 21/85* (2013.01); *H04L 12/4633* (2013.01)

(58) Field of Classification Search
CPC .... G06F 21/577; G06F 21/565; G06F 21/568; G06F 21/602; G06F 21/74; G06F 21/85; H04L 12/4633
See application file for complete search history.

(56) References Cited

U.S. PATENT DOCUMENTS

| | | | |
|---|---|---|---|
| 7,185,136 B2 | 2/2007 | Zarns | |
| 7,650,444 B2 | 1/2010 | Dirstine et al. | |
| 7,952,485 B2 | 5/2011 | Schechter et al. | |
| 10,397,272 B1* | 8/2019 | Bruss | G06N 7/01 |
| 10,868,937 B1* | 12/2020 | Feinberg | H04N 1/2158 |
| 2005/0010708 A1* | 1/2005 | Haley | G06F 1/1677 |
| | | | 710/303 |

(Continued)

*Primary Examiner* — Jung W Kim
*Assistant Examiner* — Alan L Kong
(74) *Attorney, Agent, or Firm* — Banner & Witcoff, Ltd.

(57) ABSTRACT

Arrangements for dynamic evaluation of remotely located content are provided. In some aspects, a connection may be established between an external storage receiving device and a computing platform. The connection may include an IP secure tunnel to ensure secure transmission of data. The external storage receiving device may receive an external storage device, such as a USB drive. The computing platform may generate one or more commands configured to cause data from the USB drive to be replicated, encrypted and transmitted to the computing platform. The commands may be transmitted by the computing platform to the external storage receiving device and executed. The data may be received by the computing platform and scanned to generate a status decision. Based on the generated status decision, each file may be transferred to an output folder and transmitted to other systems or devices for further evaluation use in business, or the like.

18 Claims, 9 Drawing Sheets

(56) References Cited

U.S. PATENT DOCUMENTS

| | | | |
|---|---|---|---|
| 2017/0163665 A1* | 6/2017 | McDougal | H04L 63/0209 |
| 2017/0262650 A1* | 9/2017 | Patel | H04L 63/0884 |
| 2018/0373864 A1* | 12/2018 | Apvrille | G06F 21/604 |
| 2020/0089881 A1* | 3/2020 | Graun | G06F 21/565 |
| 2020/0334061 A1* | 10/2020 | Zlotnick | G06F 11/1484 |
| 2020/0356674 A1* | 11/2020 | Nikolai | G06F 21/577 |

* cited by examiner

DISTRIBUTED SECURE CONTENT INSPECTION IN ENTERPRISE NETWORKS

BACKGROUND

Aspects of the disclosure relate to electrical computers, systems, and devices performing cybersecurity evaluation of files stored on an external storage device. In particular, aspects are directed to evaluating files stored on an external storage device located remotely from a computing platform performing the evaluation.

Some enterprise organizations are subject to regulatory requirements related to transmission of data and/or files from various geographic areas. For instance, some enterprise organizations may be required to receive files from particular areas via a universal serial bus (USB) drive or other external storage device. However, evaluating the cybersecurity of a USB drive or other external storage device and associated files may be difficult. In some examples, it may require physically shipping the USB drive to a location having a system to evaluate the cybersecurity of the USB drive and associated files, which can be time consuming and inefficient. Additionally or alternatively, some conventional arrangements include physically connecting the USB drive to a computing device, such as a laptop or other computing device, which may be air-gapped, in order to evaluate the cybersecurity of the USB drive and associated files. However, these arrangements may pose a cybersecurity threat to the laptop or other computing device receiving the USB drive. Accordingly, it would be advantageous to securely evaluate external storage devices and associated files located remotely in a secure manner.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with efficiently evaluating cybersecurity of external storage devices and associated files located remotely from an enterprise organization and associated systems.

In some aspects, a connection may be established between an external storage receiving device and a cybersecurity evaluation computing platform. The connection may include an IP secure (IP sec) tunnel to ensure secure transmission of data. In some examples, the external storage receiving device may receive an external storage device. For instance, an external storage device, such as a USB drive, may be physically connected to the external storage receiving device. In response, an indication may be transmitted to the cybersecurity evaluation platform.

In response to receiving the indication that the external storage device has been received by the external storage receiving device, the cybersecurity evaluation computing platform may generate one or more commands. For instance, one or more commands causing the USB port of the USB drive to be replicated, the replicated data to be encrypted, the encrypted data to be transmitted to the cybersecurity evaluation computing platform, and the like, may be generated. The commands may be transmitted by the cybersecurity evaluation computing platform to the external storage receiving device and executed.

The cybersecurity evaluation computing platform may receive encrypted data from the USB drive via the external storage receiving device and IPsec tunnel and may decrypt the data. One or more files stored on the USB drive may be extracted and scanned to generate a cybersecurity status decision. Based on the generated cybersecurity status decision, each file may be transferred to an output folder and transmitted to other systems or devices for further evaluation, use in the business of the enterprise, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional arrangements for evaluating cybersecurity of content held remotely on an external storage device can be inefficient and time-consuming. Accordingly, aspects discussed herein are related to securely transmitting content from an external storage device, such as a USB drive, to an enterprise system in a remote location for evaluation.

As discussed herein, in some examples, an external storage receiving device may receive an external storage device, such as a USB drive. The USB drive may be physically connected to the external storage receiving device and both the external storage receiving device and external storage device may be remotely located from an enterprise system configured to evaluate cybersecurity of content on the USB drive, such as a cybersecurity evaluation computing platform. In some examples, the USB drive may be located in a region or area identified as high-risk.

The content from the USB drive may be encrypted and transmitted to the enterprise system for evaluation via an IPsec tunnel. Accordingly, the encrypted data may be securely transmitted and any devices, networks, or the like, may be protected from any malware or other malicious content in the files on the USB drive.

Upon receiving the data, the data may be decrypted and each file received may be scanned to determine whether the file is secure or potentially unsecure. Based on that cybersecurity status, each file may be transferred to an output folder and then may be transmitted to other devices, systems, or the like for further evaluation, use in the business of the enterprise, or the like.

These and various other arrangements will be discussed more fully below.

Figure 1A:
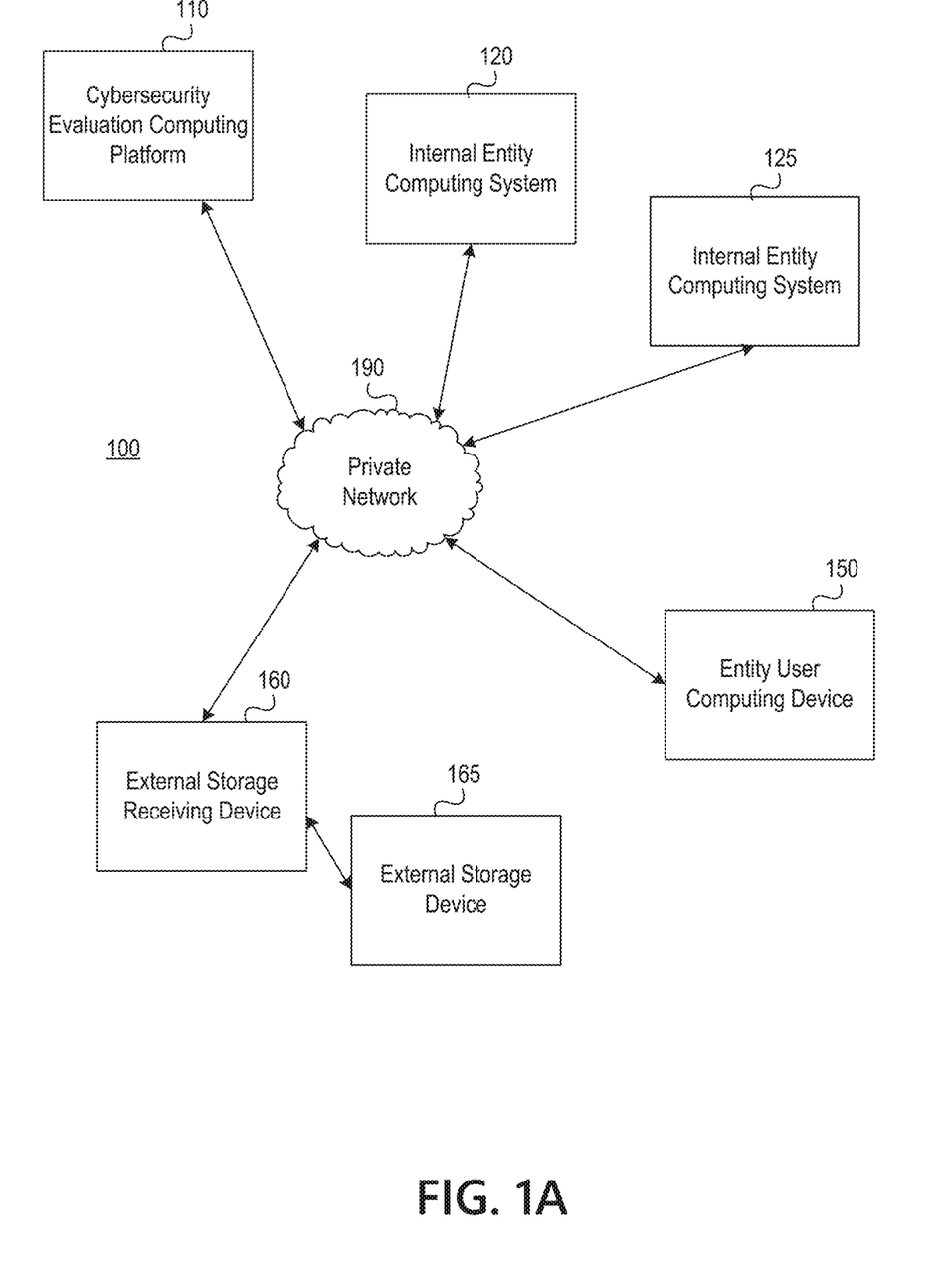
FIGS. 1A and 1B depict an illustrative computing environment for implementing cybersecurity evaluation functions in accordance with one or more aspects described herein.
Figure 1B:
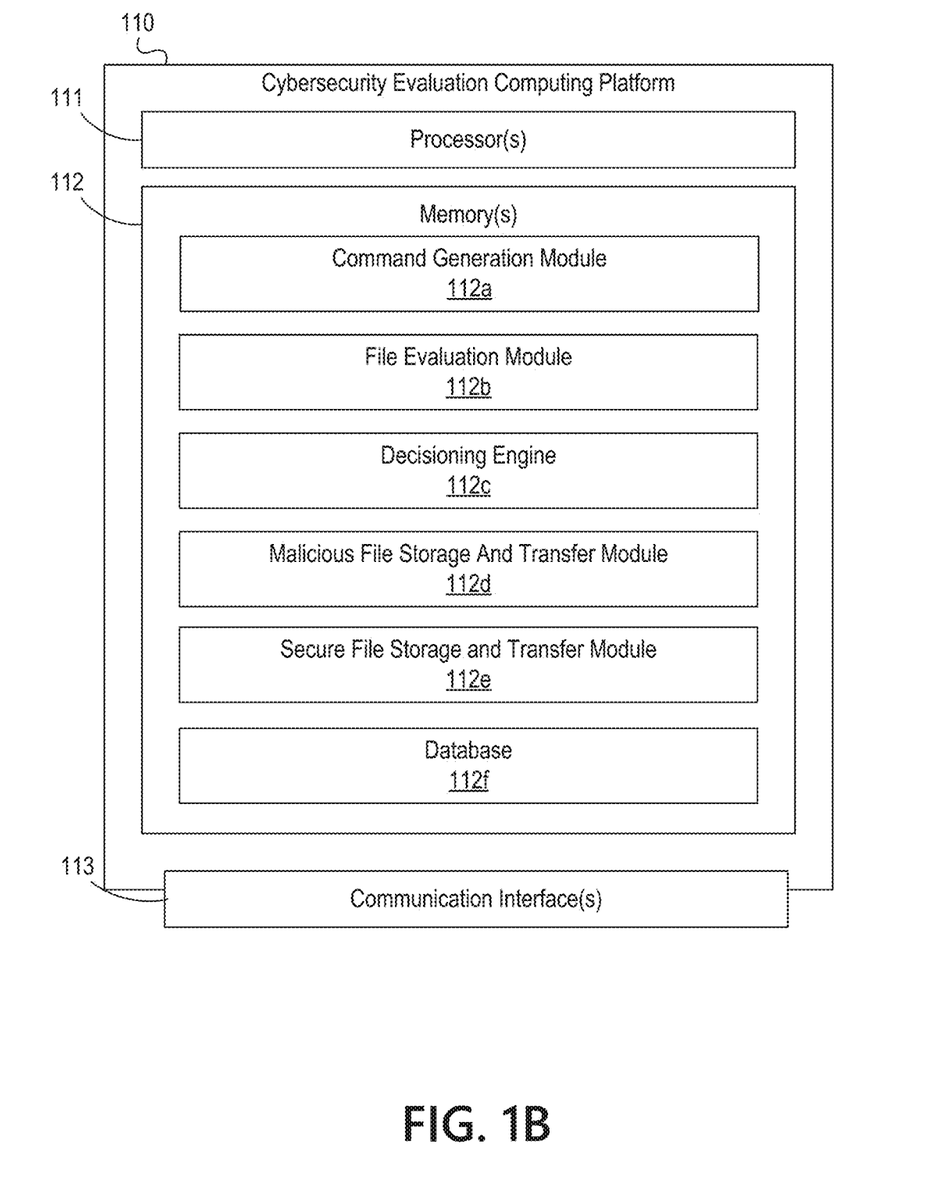

FIGS. 1A-1B depict an illustrative computing environment for implementing and using external device content cybersecurity evaluation functions in accordance with one or more aspects described herein. Referring to FIG. 1A, computing environment 100 may include one or more computing devices and/or other computing systems. For example, computing environment 100 may include cybersecurity evaluation computing platform 110, internal entity computing system 120, internal entity computing system 125, entity user computing device 150, external storage receiving device 160 and external storage device 165. Although two internal entity computing systems 120, 125 are shown, more or fewer internal entity computing systems may be used without departing from the invention. Further, although one entity user computing device 150, external storage receiving device 160 and external storage device 165 are shown, more devices may be used without departing from the invention. For instance, one or more computing environments may include an external storage receiving device 160 having a plurality of ports (e.g., USB ports) for receiving a plurality of external storage devices simultaneously or near-simultaneously and/or evaluating content on the plurality of external storage devices simultaneously or near-simultaneously. Additionally or alternatively, the computing environment 100 may include a plurality of external storage receiving devices 160 in a plurality of locations (e.g., different locations of an enterprise organization, different geographic regions, or the like). In at least some examples, one or more locations of the plurality of locations may be a location remote from the cybersecurity evaluation computing platform 110.

Cybersecurity evaluation computing platform 110 may be configured to provide intelligent, dynamic external storage device content evaluation and risk mitigation functions. For instance, cybersecurity evaluation computing platform 110 may receive content securely captured from one or more external storage devices 165 (e.g., USB drives) and transmitted via the network from the external storage receiving device 160. The data may be securely transmitted to prevent any potential malicious content from corrupting devices, networks, system, or the like, connected to the network. For instance, in some examples, cybersecurity evaluation computing platform 110 may cause replication of a hardware connection between the external storage device 165 and external storage receiving device 160 and may convert that connection to network traffic that may be transmitted via a secure tunnel (e.g., IPSec tunnel) from the external storage receiving device 160 to a secure storage area or content evaluation area of the cybersecurity evaluation computing platform 110.

Cybersecurity evaluation computing platform 110 may evaluate the received content to determine whether it includes malicious content, poses a risk or potential risk, and the like. After evaluating content received from the external storage device 165 (e.g., one or more files, or the like), the cybersecurity evaluation computing platform 110 may transmit evaluated content to one of: a malicious content evaluation area at, for instance, an entity computing device, or to an enterprise system. For instance, if content (e.g., a first file) is determined to be potentially unsecure or malicious, the first file may be transferred to a malicious content evaluation area for further evaluation, identification of a source of the malicious content, risk mitigation action identification, and the like. If content (e.g., a second file) is determined to be safe (e.g., does not pose a threat or potential threat), the content may be transferred to one or more enterprise systems, such as internal entity computing system 120, internal entity computing system 125, or the like. In some examples, content may be transferred to an intended recipient via email, network share site, or the like.

Internal entity computing system 120 and/or internal entity computing system 125 may be one or more computing devices, systems, or the like, associated with the entity or enterprise organization implementing the cybersecurity evaluation computing platform 110. Internal entity computing system 120 and/or internal entity computing system 125 may have or include one or more databases, file storage systems, may host or execute one or more applications, and the like, used for execution of the business of the entity or enterprise organization.

Entity user computing device 150 may be one or more computing devices associated with the enterprise organization. For instance, entity user computing device 150 may be a computing device accessed by one or more users (e.g., employees of the enterprise organization) in the course of business and may be used to control evaluation of content on external storage devices, track content evaluation and results, receive and display content determined to be secure, and the like. In some examples, entity user computing device 150 may be a computing device associates with a content inspection user and files identified as potentially malicious may be transferred to the entity user computing device 150, or system accessible via the entity user computing device 150, for further inspection and/or evaluation.

External storage receiving device 160 may be or include a device configured with one or more external ports, such as universal serial bus (USB) ports including, for instance, USB 2.0, USB 3.0, and the like. In some examples external storage receiving device 160 may be a worker or node device controlled by a primary computing device, such as cybersecurity evaluation computing platform 110, having unidirectional control over the worker or node device. External storage receiving device 160 may be configured to connect to an external storage device, such as external storage device 165, and facilitate transmission of the data from the external storage device 165 to a secure area for evaluation. In some examples, one or more aspects associated with replicating a serial bus of the external storage device 165, converting the replicated serial bus to network traffic, transmitting the network traffic via the secure tunnel, encrypting the network traffic, and the like, may be performed by the external storage receiving device 160. In some examples, the external storage receiving device 160 may be in a same physical location and/or part of cybersecurity evaluation computing platform 110. In other examples, external storage receiving device may be in a separate physical location from the cybersecurity evaluation computing platform 110.

Computing environment 100 also may include one or more computing platforms. For example, and as noted above, computing environment 100 may include cybersecurity evaluation computing platform 110. As illustrated in greater detail below, cybersecurity evaluation computing platform 110 may include one or more computing devices configured to perform one or more of the functions described herein. For example, cybersecurity evaluation computing platform 110 may include one or more computers (e.g., laptop computers, desktop computers, servers, server blades, or the like).

As mentioned above, computing environment 100 also may include one or more networks, which may interconnect one or more of cybersecurity evaluation computing platform 110, internal entity computing system 120, internal entity computing system 125, entity user computing device 150, external storage receiving device 160, external storage device 165, and the like. For example, computing environment 100 may include private network 190. In some examples, the computing environment 100 may also include a public network through which one or more devices external to the enterprise organization may access one or more systems within the enterprise organization. Private network 190 and/or any public network may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cybersecurity evaluation computing platform 110, internal entity computing system 120, internal entity computing system 125, entity user computing device 150, external storage receiving device 160, external storage device 165, may be associated with an enterprise organization (e.g., a financial institution), and private network 190 may be associated with and/or operated by the organization, and may include one or more networks (e.g., LANs, WANs, virtual private networks (VPNs), or the like) that interconnect cybersecurity evaluation computing platform 110, internal entity computing system 120, internal entity computing system 125, entity user computing device 150, external storage receiving device 160, external storage device 165, and one or more other computing devices and/or computer systems that are used by, operated by, and/or otherwise associated with the organization.

Referring to FIG. 1B, cybersecurity evaluation computing platform 110 may include one or more processors 111, memory 112, and communication interface 113. A data bus may interconnect processor(s) 111, memory 112, and communication interface 113. Communication interface 113 may be a network interface configured to support communication cybersecurity evaluation computing platform 110 and one or more networks (e.g., private network 190, public network, or the like). Memory 112 may include one or more program modules having instructions that when executed by processor(s) 111 cause cybersecurity evaluation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cybersecurity evaluation computing platform 110 and/or by different computing devices that may form and/or otherwise make up cybersecurity evaluation computing platform 110.

For example, memory 112 may have, store and/or include command generation module 112a. Command generation module 112a may store instructions and/or data that may cause or enable the cybersecurity evaluation computing platform 110 to generate one or more commands causing functions such as replicating a USB port, encrypting replicated data, transmitting encrypted data via an IPsec tunnel, and the like, to be performed. In some examples, the generated commands may be transmitted to an external storage receiving device 160 for execution.

Cybersecurity evaluation computing platform 110 may further have, store and/or include file evaluation module 112b. File evaluation module 112b may store instructions and/or data that may cause or enable the cybersecurity evaluation computing platform 110 to receive encrypted data via the IPsec tunnel, decrypt the data and extract files, such as files stored by an external storage device 165 received by external storage receiving device 160. Each file may then be scanned using one or more scanning processes to evaluate whether each file is secure or potentially unsecure (e.g., includes malware, is corrupted, or the like).

Cybersecurity evaluation computing platform 110 may further have, store and/or include decisioning engine 112c. Decisioning engine 112c may store instructions and/or data that may cause or enable cybersecurity evaluation computing platform 110 to determine, based on the one or more scanning processes performed on each file, a cybersecurity status of each file. For instance, the decisioning engine 112c may determine, based on results of the one or more scanning processes, whether each file has a first cybersecurity status (e.g., potentially unsecure, malicious, or the like) or a second cybersecurity status (e.g., secure or safe). In some examples, the decisioning engine 112c may produce a binary decision of secure or unsecure. Additionally or alternatively, files may be determined to have a status from two, three or more possible decisioning outputs (e.g., secure, potentially unsecure, potentially unsecure but available for remediation, potentially unsecure quarantine, or the like). Various other statuses may be used without departing from the invention.

Cybersecurity evaluation computing platform 110 may further have, store and/or include malicious file storage and transfer module 112d. Malicious file storage and transfer module 112d may store instructions and/or data that may cause or enable the cybersecurity evaluation computing platform 110 to store files identified as having a second cybersecurity status (e.g., potentially unsecure or malicious) and transfer the files to one or more enterprise computing devices, such as entity user computing device 150, for further evaluation. For instance, malicious file storage and transfer module 112d may transfer files to an enterprise computing device to further evaluate the files to determine, for instance, a source of the file, whether remediation of the file is available, additional mitigating actions to execute, a type of malware, or the like.

Cybersecurity evaluation computing platform 110 may further have, store and/or include secure file storage and transfer module 112d. Secure file storage and transfer module 112d may store instructions and/or data that may cause or enable the cybersecurity evaluation computing platform 110 to store files identified as having a second cybersecurity status (e.g., secure) and transfer the files one or more intended recipients, internal entity computing systems 120, or the like. For instance, one or more files identified as secure may be transferred to a file storage server enabling access to the file by one or more enterprise users or user devices. Various other internal entity computing systems may receive secure files without departing from the invention.

Cybersecurity evaluation computing platform 110 may further have, store and/or include a database 112f. Database 112f may store various data related to enterprise users, scans performed, cybersecurity status decisions, and the like.

Figure 2:
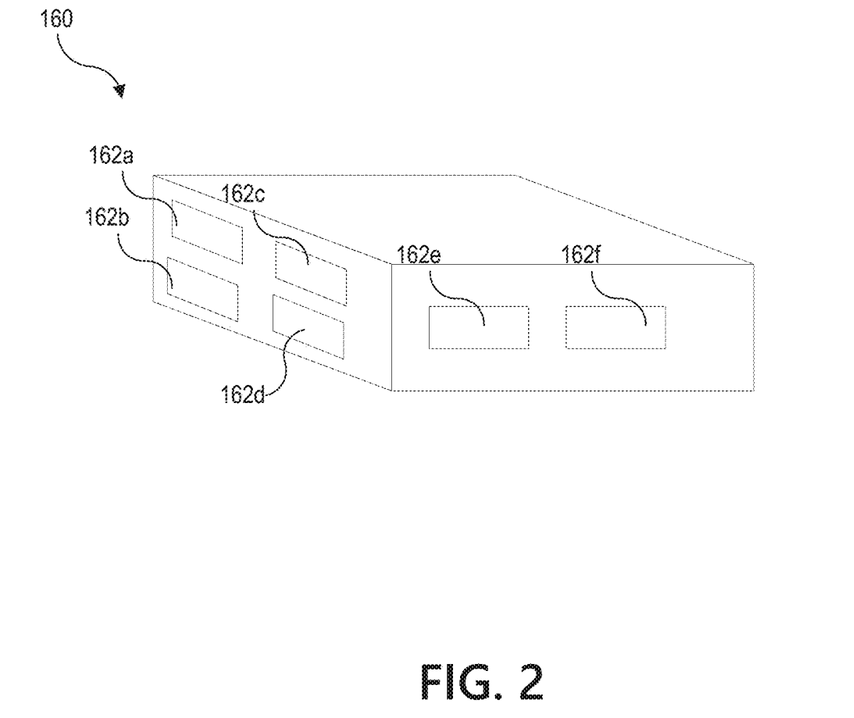
FIG. 2 is a schematic drawing of an example external storage receiving device in accordance with one or more aspects described herein.

FIG. 2 is a schematic diagram of an example external storage receiving device 160. As shown, the device may include a plurality of receiving ports 162a-162f. In some examples, the ports 162a-162f may be configured to receive an external storage device 165, such as a USB drive. In some arrangements, each port 162a-162f may be configured with a same connection such that a same type of device or a device having a first type of connection may be received by the port. Additionally or alternatively, one or more ports 162a-162f may have a different connection configuration to receive external storage devices having one or more different types of connections (e.g., connector configurations).

FIGS. 3A-3D depict one example illustrative event sequence for receiving external storage device data and performing cybersecurity evaluations on the data in accordance with one or more aspects described herein. The events shown in the illustrative event sequence are merely one example sequence and additional events may be added, or events may be omitted, without departing from the invention. Further, one or more processes discussed with respect to FIGS. 3A-3D may be performed in real-time or near real-time.

Figure 3A:
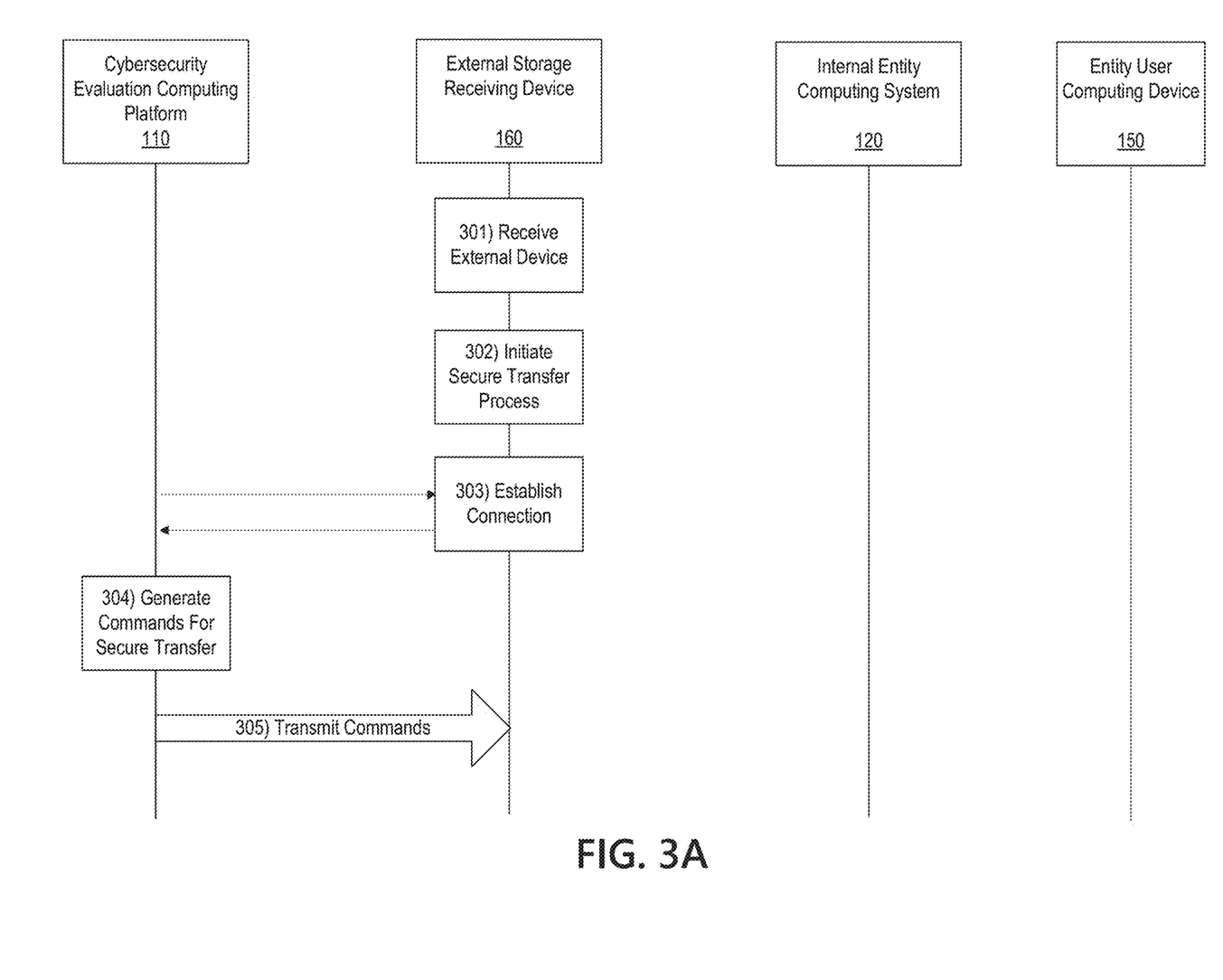
FIGS. 3A-3D depict an illustrative event sequence for implementing cybersecurity evaluation functions in accordance with one or more aspects described herein.

Referring to FIG. 3A, at step 301, an external storage device, such as external storage device 165 may be received by external storage receiving device 160. For instance, a USB drive may be inserted into a port of the external storage receiving device 160.

In response to receiving the external storage device 165, a secure transfer and evaluation protocol may be initiated at step 302. For instance, one or more functions associated with the transmission and evaluation of the cybersecurity of the external storage device 165 and/or data thereon may be initiated or activated.

In some examples, initiating or activating functions may include establishing a connection with cybersecurity evaluation computing platform 110. Accordingly, at step 303, a connection may be established between the external storage receiving device 160 and the cybersecurity evaluation computing platform 110. For instance, a first wireless connection may be established between the external storage receiving device 160 and cybersecurity evaluation computing platform 110. Upon establishing the first wireless connection, a communication session may be initiated between cybersecurity evaluation computing platform 110 and external storage receiving device 160.

Although the arrangement described in FIG. 3A includes receiving an external storage device 165 by the external storage receiving device 160 prior to establishing a connection, in some examples, a connection may be established between the external storage receiving device 160 and cybersecurity evaluation computing platform 110 prior to the external storage device 165 being connected to external storage receiving device 160.

At step 304, the cybersecurity evaluation computing platform 110 may generate one or more commands to capture, transfer, evaluate, and the like, the external storage device 165 and/or data thereon. For instance, the cybersecurity evaluation computing platform 110 may generate one or more commands to (or causing the external storage receiving device to) replicate the serial bus connection, transmit the data as network traffic, encrypt the data, decrypt the data, and the like.

At step 305, the cybersecurity evaluation computing platform 110 may transmit the generated commands to the external storage receiving device 160.

Figure 3B:
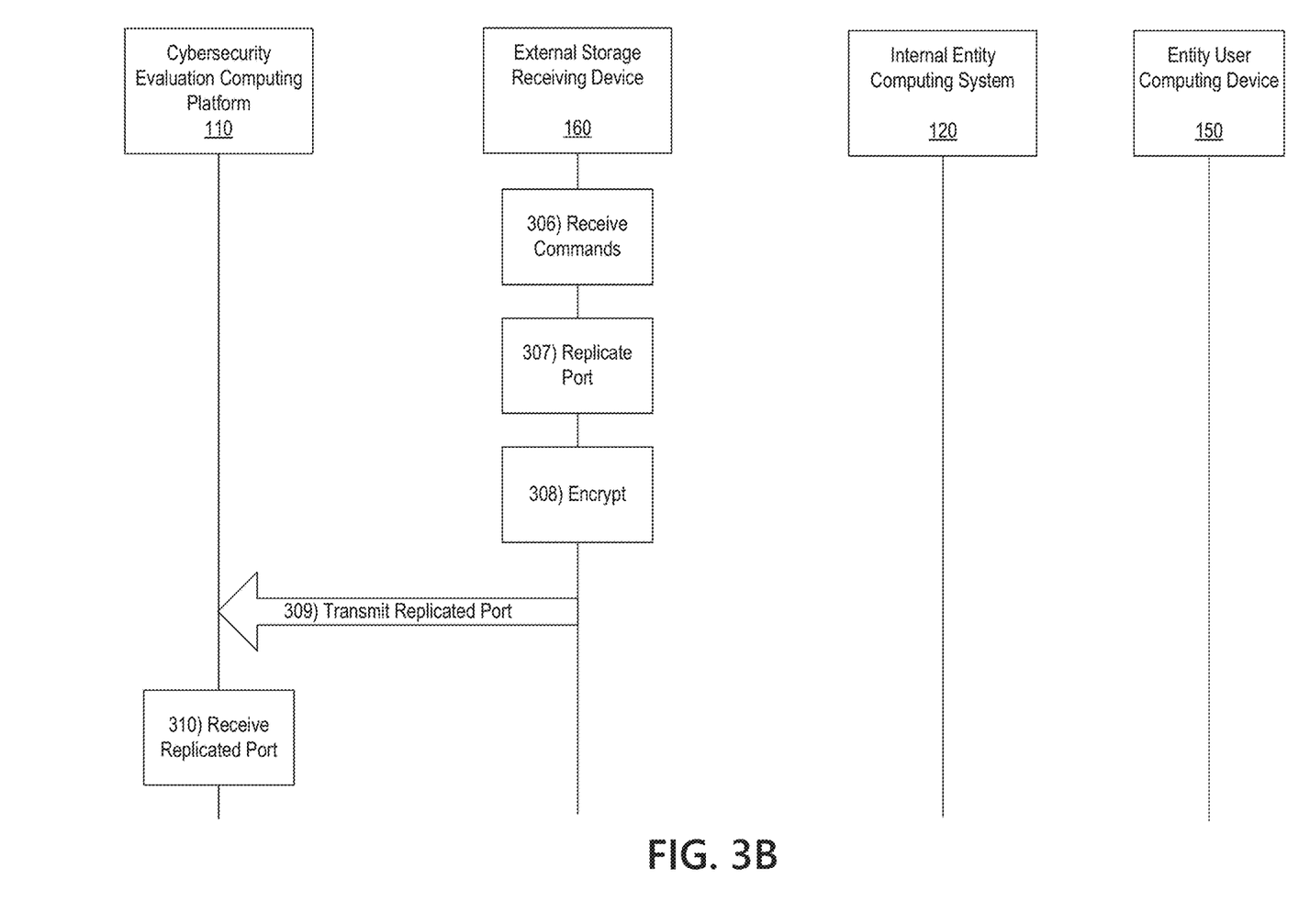

With reference to FIG. 3B, at step 306, the external storage receiving device 160 may receive the generated commands and execute one or more commands. For instance, at step 307, the external storage receiving device 160 may replicate the serial bus connection of the external storage device 165 over internet protocol (IP). For instance, the connection may be converted to network traffic that may be securely transmitted for evaluation.

At step 308, the replicated serial bus connection may be encrypted. For instance, the data may be encrypted using IP security (IPsec) protocols that may provide end-to-end security.

At step 309, the external storage receiving device 160 may transmit the encrypted data to the cybersecurity evaluation computing platform 110. In some examples, the encrypted data may be transmitted via an IPsec tunnel created or established to securely transmit and receive data captured from the external storage device 165.

At step 310, the cybersecurity evaluation computing platform 110 may receive the encrypted data in, for instance, a demilitarized zone (DMZ) of the cybersecurity evaluation computing platform 110. In some examples, the DMZ or other content secure area may be equipped with enterprise level host protection application configured to decrypt data, extract files, evaluate files, and the like.

Figure 3C:
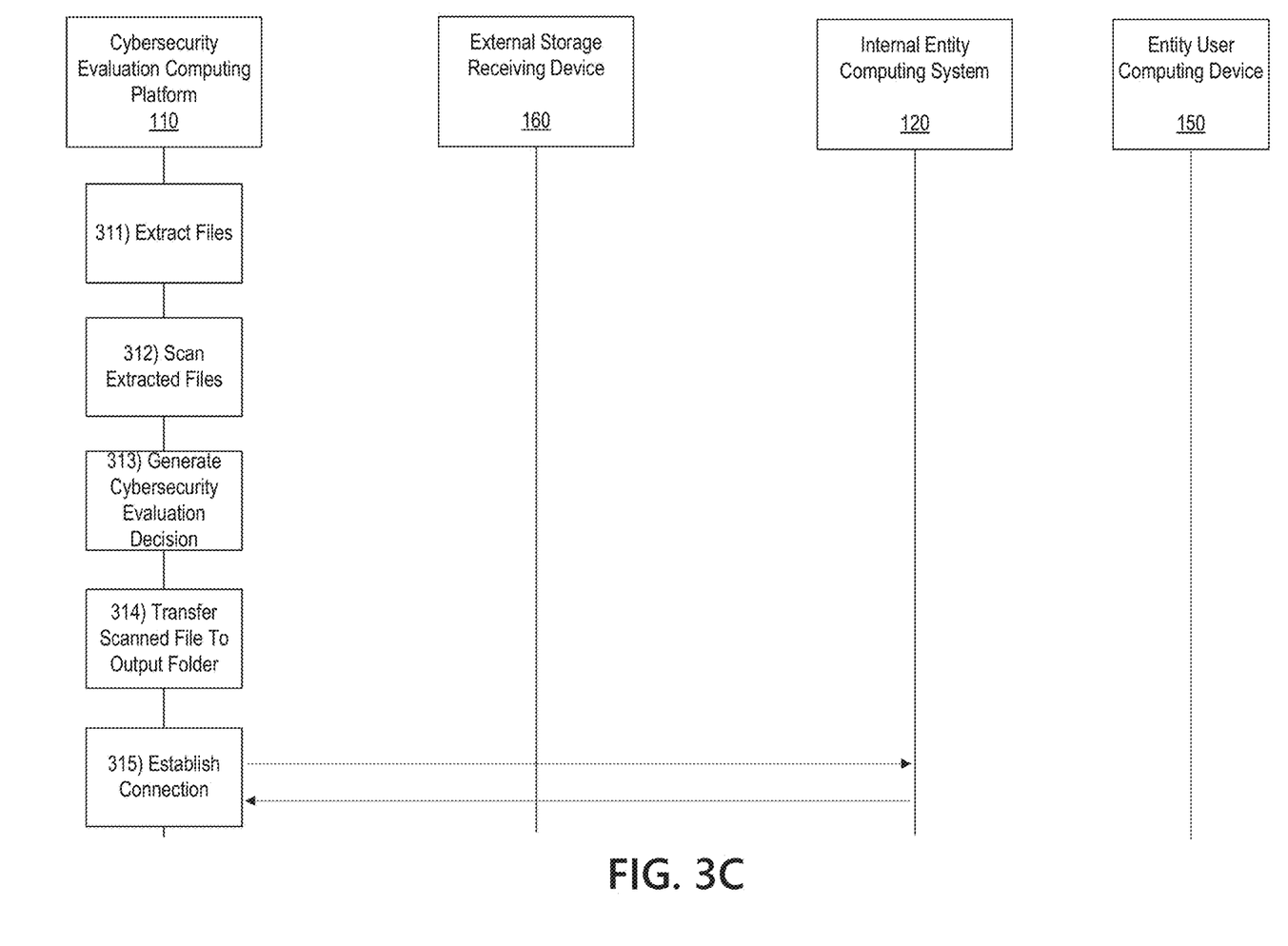

With reference to FIG. 3C, at step 311, the data may be decrypted and files from the external storage device 165 may be extracted for evaluation.

At step 312, the cybersecurity evaluation computing platform 110 may scan the extracted files to identify a cybersecurity status of the file. In some examples, each file extracted from the data transferred from the external storage device 165 may be scanned. Additionally or alternatively, multiple scans (e.g., scans for different types of content, or the like) may be executed on the files.

At step 313, the cybersecurity evaluation computing platform 110 may generate a cybersecurity evaluation decision for each file received from the external storage device 165. For instance, if malware or other malicious content is identified in the scan of a file, the file may be identified has potentially unsecure. Alternatively, if malware or other malicious content is not identified via the scan of the file, the file may be identified as secure.

At step 314, the scanned files may be transferred to an output folder or region based on the cybersecurity evaluation decision determined. For instance, files identified as potentially unsecure may be transferred to an output folder or region to be securely held until transferred for further processing. Alternatively, files identified as secure may be transferred to an output folder or region to be held until transferred to an appropriate system, user, recipient, or the like.

At step 315, a connection may be established between the cybersecurity evaluation computing platform 110 and internal entity computing system 120. For instance, a second wireless connection may be established between the cybersecurity evaluation computing platform 110 and internal entity computing system 120. Upon establishing the second wireless connection, a communication session may be initiated between cybersecurity evaluation computing platform 110 and internal entity computing system 120.

Figure 3D:
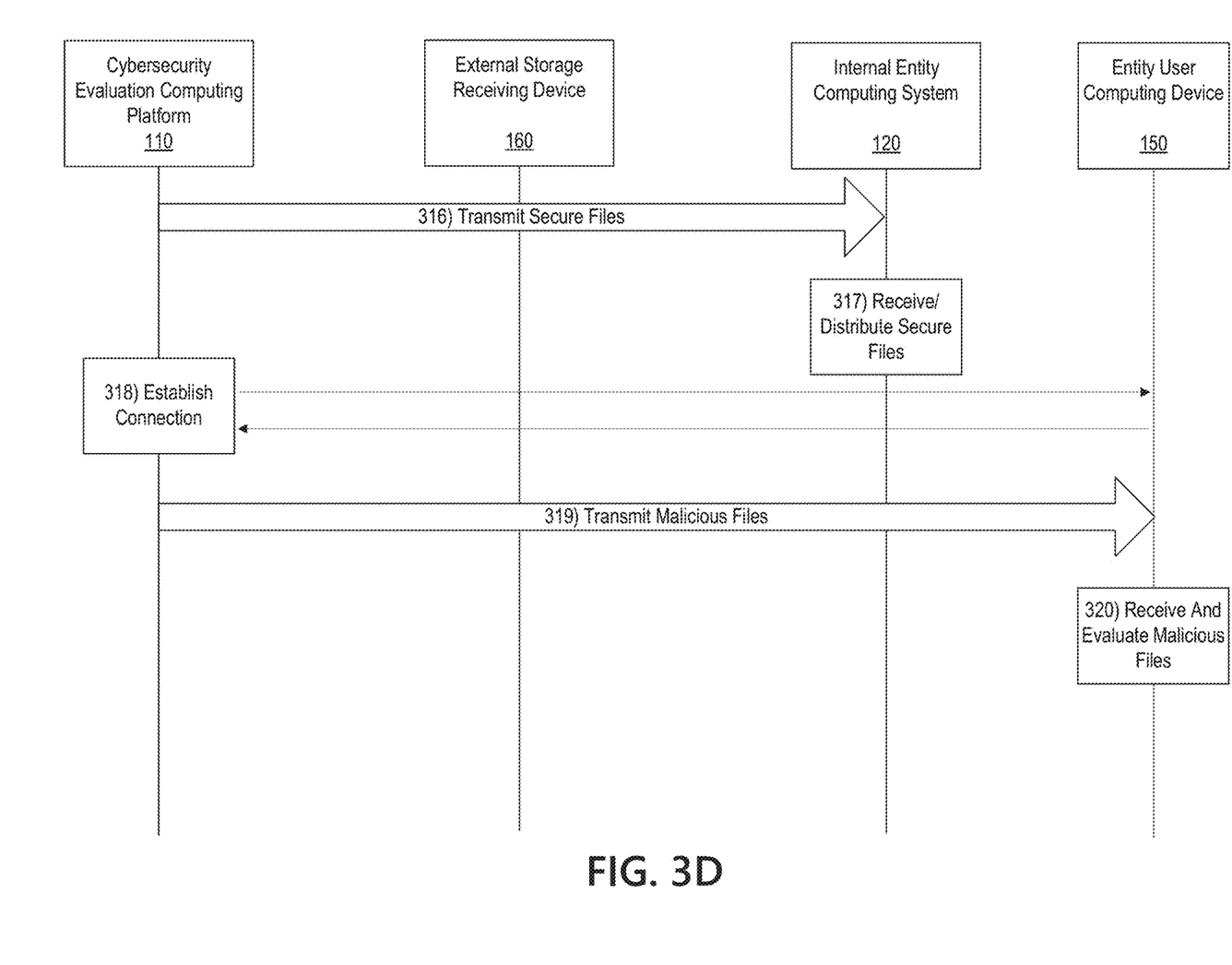

With reference to FIG. 3D, at step 316, the cybersecurity evaluation computing platform 110 may transmit files identified as secure to the internal entity computing system 120. The files may be transmitted during the communication session initiated upon establishing the second wireless connection. In some arrangements, files evaluated and identified as secure may be transmitted to the internal entity computing system 120 for use, distribution, or the like. For instance, the internal entity computing system 120 may be an email server and a secure file may be transmitted to the email server and sent to an intended recipient. In another example, the internal entity computing system 120 may be an internal document storage server and the files identified as secure may be transmitted for storage by the server, which may be accessible to one or more users of the enterprise organization.

In some examples, transmitting the files may include processing the files through standard enterprise content inspection processes. For instance, the files may be transmitted through enterprise firewalls and content inspection areas over IP.

At step 317, the files identified as secure, and, in some examples, if determined, based on enterprise content inspection processes to be secure, may be received by the internal entity computing system 120 and/or distributed to one or more users, user devices, other systems, or the like.

At step 318, a connection may be established between the cybersecurity evaluation computing platform 110 and entity user computing device 150. For instance, a third wireless connection may be established between the cybersecurity evaluation computing platform 110 and entity user computing device 150. Upon establishing the third wireless connection, a communication session may be initiated between cybersecurity evaluation computing platform 110 and entity user computing device 150.

At step 319, the cybersecurity evaluation computing platform 110 may transmit files identified as potentially unsecure or malicious to the entity user computing device 150. The files may be transmitted during the communication session initiated upon establishing the third wireless connection. In some examples, files evaluated and identified as potentially unsecure or malicious may be transmitted to the entity user computing device 150 for further evaluation, scanning, identification for quarantine, or the like. In some examples, the files may be transmitted securely and may be evaluated by a user via secure systems, applications, and the like.

In some examples, transmitting the files identified as potentially unsecure may include transmitting the files through enterprise content inspection processes, including firewalls, content inspection areas, and the like. Accordingly, in some examples, the entity user computing device 150 receiving the files may be a device configured to receive any file identified as potentially unsecure (e.g., via firewall inspection or the like).

At step 320, the entity user computing device 150 may receive and further evaluate the files identified as potentially unsecure or malicious. In some examples, further evaluation may include identifying a type of malware, an origination point of the file, any mitigating actions that may be executed to reduce or eliminate risk, and the like.

Although FIG. 3D illustrates secure files as being transmitted to internal entity computing system 120 and potentially unsecure files as being transmitted to entity user computing device 150, in some examples, secure files may also be transferred directly to an entity user computing device 150 (e.g., via email, network share, or the like) and/or potentially malicious or unsecure files may be transmitted to internal entity computing system 120 for quarantine, evaluation, or the like.

Figure 4:
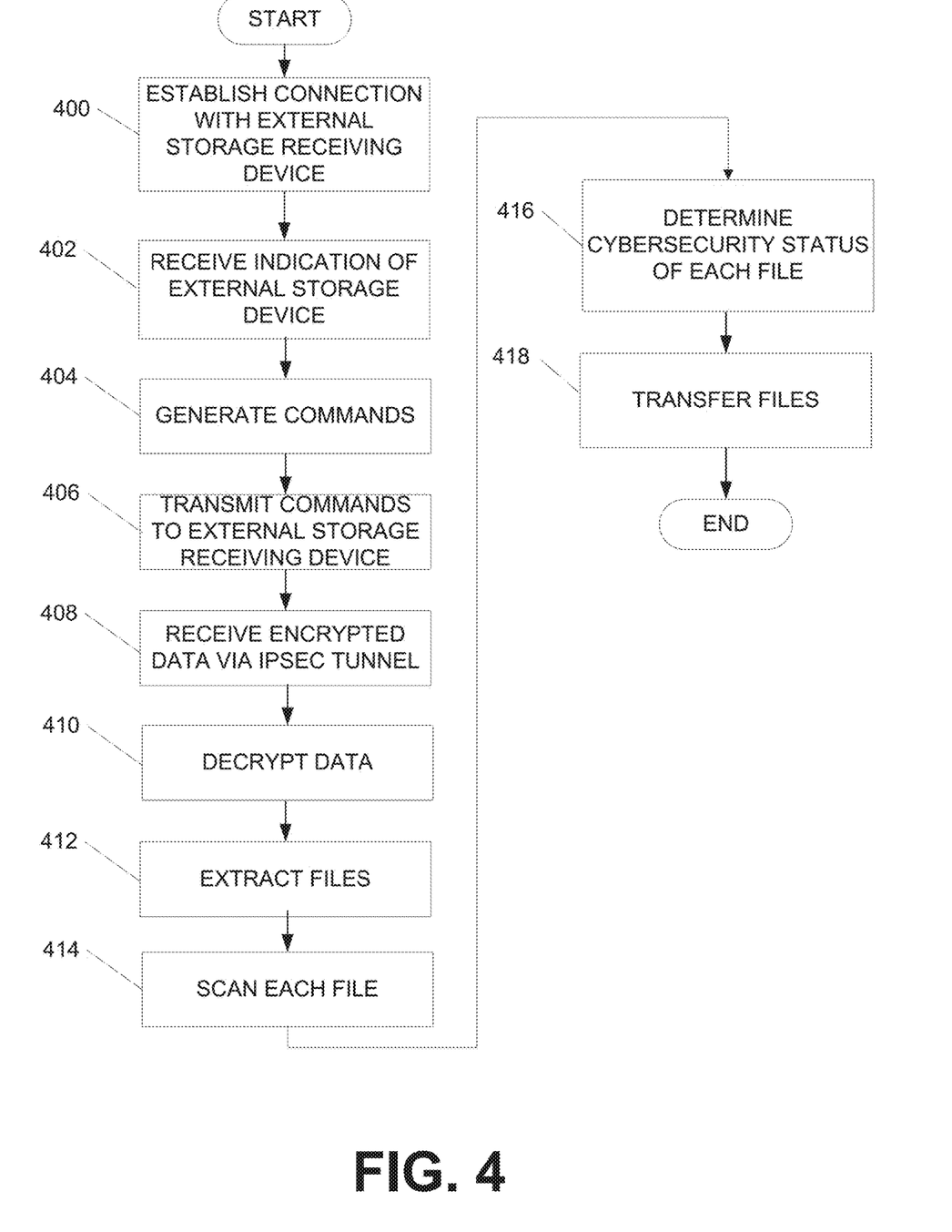
FIG. 4 illustrates an illustrative method for implementing cybersecurity evaluation functions according to one or more aspects described herein.

FIG. 4 is a flow chart illustrating one example method of dynamically evaluating content from an external storage device in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a connection may be established between the cybersecurity evaluation computing platform 110 and an external storage receiving device 160. In some examples, the external storage receiving device 160 may be configured with a plurality of ports to receive one or more external storage devices, such as external storage device 165, or the like. Various external storage devices may be received by the external storage receiving device (e.g., USB devices, or the like). In some examples, the external storage receiving device 160 may be a worker device or node controlled by another, primary computing device, such as cybersecurity evaluation computing platform 110 having unidirectional control over the worker or node device(s) (e.g., external storage receiving device 160). In some arrangements, cybersecurity evaluation computing platform 110 may be located remotely from external storage receiving device 160.

At step 402, cybersecurity evaluation computing platform 110 may receive an indication that an external storage device 165, such as a USB drive, has been received by the external storage receiving device 160. For instance, an external storage device 165 may be physically connected to external storage receiving device 160, e.g., via one of the ports arranged on the external storage receiving device 160. The external storage device 165 may store or include a plurality of files.

At step 404, cybersecurity evaluation computing platform 110 may generate one or more commands or instructions. For instance, cybersecurity evaluation computing platform 110 may generate one or more commands to replicate a USB port of the external storage device 165, encrypt the replicated data, transmit the encrypted data via an IPsec tunnel established via the communication session established between the cybersecurity evaluation computing platform 110 and the external storage receiving device 160, and the like.

At step 406, the generated commands may be transmitted by the cybersecurity evaluation computing platform 110 to the external storage receiving device 160. Receiving the commands by the external storage receiving device 160 may cause external storage receiving device 160 to execute the commands, causing various functions to perform (e.g., USB port to be replicated, replicated data to be encrypted, encrypted data to be sent via IPsec tunnel, and the like).

At step 408, the cybersecurity evaluation computing platform 110 may receive the encrypted data via the IPsec tunnel. At step 410, the cybersecurity evaluation computing platform 110 may decrypt the received, encrypted data.

At step 412, cybersecurity evaluation computing platform 110 may extract files from the decrypted data. For instance, the plurality of files stored or included on the external storage device 165 may be extracted from the received data.

At step 414, cybersecurity evaluation computing platform 110 may scan each file of the plurality of files. For instance, one or more scanning operations may be performed to evaluate each file to determine whether it is secure or potentially unsecure (e.g., includes malware, or the like).

At step 416, based on the scanning performed at step 414, cybersecurity evaluation computing platform 110 may determine a cybersecurity status of each file. For instance, cybersecurity evaluation computing platform 110 may determine a cybersecurity status of each file as, for instance, having a first cybersecurity status (e.g., potentially unsecure, malicious, or the like) or having a second cybersecurity status (e.g., secure).

At step 418, files having the first cybersecurity status may be transferred to a first output folder and files having the second cybersecurity status may be transferred to a second output folder. The files of the first output folder may be transmitted to one or more enterprise computing devices for further evaluation (e.g., identification of source, identification of mitigating actions, and the like) and files of the second output folder may be transmitted to one or more intended recipients, internal entity computing systems, or the like.

As discussed herein, aspects described are directed to securely evaluating cybersecurity of content being transferred to an enterprise system via an external storage device, such as a USB drive. In some examples, the content being transferred, and associated external storage device, may be located remotely from the enterprise system evaluating the content. Accordingly, as discussed herein, data may be replicated, encrypted and transmitted to a secure inspection area via an IPsec tunnel. This may protect devices, networks, and the like, associated with the inspection and evaluation. The arrangements described herein may be used to increase efficiency in receiving and evaluating content by eliminating the need to transfer the external storage device to the remote enterprise location and/or by securely transmitting data via an external storage receiving device connected to the external storage device.

Although aspects described herein are related to transferring content and, in some examples, regulatory requirements that require content to be transferred via external storage devices, the arrangements described herein may be used in a variety of arrangements in which external storage devices are used to transfer, display, or the like, data. For instance, a user may provide financial data to a financial institution via one or more files (e.g., spreadsheets or the like) stored on an external storage device, such as a USB drive. Rather than inserting the USB drive into a user computing device at the financial institution, the user may connect the USB drive to the external storage receiving device in order to securely transmit the data from the USB drive to the computing device of the financial institution. Various other arrangements for securely providing data via a USB drive may be used with the examples discussed herein without departing from the invention.

Figure 5:
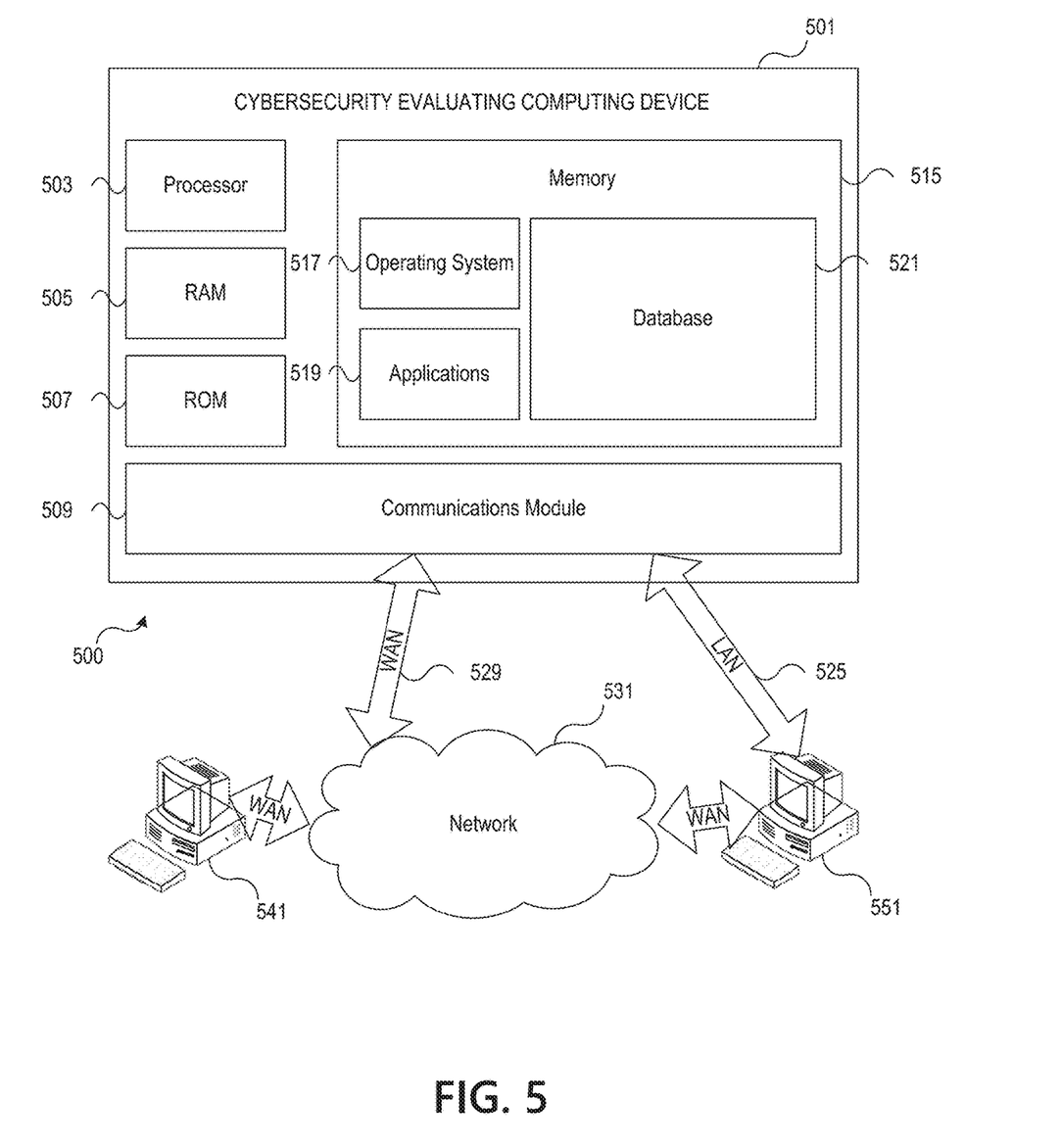
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include cybersecurity evaluation computing device 501 having processor 503 for controlling overall operation of cybersecurity evaluation computing device 501 and its associated components, including Random Access Memory (RAM) 505, Read-Only Memory (ROM) 507, communications module 509, and memory 515. Cybersecurity evaluation computing device 501 may include a variety of computer readable media. Computer readable media may be any available media that may be accessed by cybersecurity evaluation computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by cybersecurity evaluation computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cybersecurity evaluation computing device 501. Such a processor may execute computer-executable instructions stored on a computer-readable medium.

Software may be stored within memory 515 and/or storage to provide instructions to processor 503 for enabling cybersecurity evaluation computing device 501 to perform various functions as discussed herein. For example, memory 515 may store software used by cybersecurity evaluation computing device 501, such as operating system 517, application programs 519, and associated database 521. Also, some or all of the computer executable instructions for cybersecurity evaluation computing device 501 may be embodied in hardware or firmware. Although not shown, RAM 505 may include one or more applications representing the application data stored in RAM 505 while cybersecurity evaluation computing device 501 is on and corresponding software applications (e.g., software tasks) are running on cybersecurity evaluation computing device 501.

Communications module 509 may include a microphone, keypad, touch screen, and/or stylus through which a user of cybersecurity evaluation computing device 501 may provide input, and may also include one or more of a speaker for providing audio output and a video display device for providing textual, audiovisual and/or graphical output. Computing system environment 500 may also include optical scanners (not shown).

Cybersecurity evaluation computing device 501 may operate in a networked environment supporting connections to one or more remote computing devices, such as computing devices 541 and 551. Computing devices 541 and 551 may be personal computing devices or servers that include any or all of the elements described above relative to cybersecurity evaluation computing device 501.

The network connections depicted in FIG. 5 may include Local Area Network (LAN) 525 and Wide Area Network (WAN) 529, as well as other networks. When used in a LAN networking environment, cybersecurity evaluation computing device 501 may be connected to LAN 525 through a network interface or adapter in communications module 509. When used in a WAN networking environment, cybersecurity evaluation computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   establish a connection with a secure external storage receiving device located remotely from the computing platform;
   receive, from the secure external storage receiving device, an indication that an external storage device storing a plurality of files has been connected to a port of the secure external storage receiving device, wherein receiving the indication; causes the computing platform to generate commands causing the external storage receiving device to execute one or more functions, the one or more functions including replicating data associated with the external storage device, and encrypting the replicated data;
   transmit the generated commands to the external storage receiving device;
   receive, via an Internet Protocol (IP) secure (IPsec) tunnel provided via the established connection, the encrypted replicated data from the external storage device via the external storage receiving device;
   decrypt the encrypted replicated data;

extract, from the decrypted replicated data, the plurality of files;

execute, on each file of the plurality of files, a scan to determine a cybersecurity status of each file;

determine, based on the scan, the cybersecurity status of each file;

transfer, to a first output folder of the computing platform, all files of the plurality of files having a first cybersecurity status;

transmit, to a user computing device associated with an enterprise organization, the files of the plurality of files having the first cybersecurity status for further processing including at least one of: identifying a source of a file, determining whether remediation of a file is available, identifying additional mitigation actions to execute, or identifying a type of malware; and transfer, to a second output folder of the computing platform different from the first output folder, all files of the plurality of files having a second cybersecurity status.

2. The computing platform of claim 1, wherein the external storage device is physically connected to the external storage receiving device.

3. The computing platform of claim 1, wherein the external storage device is a universal serial bus storage device.

4. The computing platform of claim 1, wherein the replicated data is received by a content secure area of the computing platform.

5. The computing platform of claim 1, further comprising instructions that, when executed, cause the computing platform to:

establish a second connection, different from the established connection, with an internal entity computing system of the enterprise organization different from the computing platform and the external storage receiving device.

6. The computing platform of claim 5, further including instructions that, when executed, cause the computing platform to:

transmit the files of the plurality of files having the second cybersecurity status to the internal entity computing system of the enterprise organization through the second connection.

7. The computing platform of claim 6, further comprising instructions that, when executed, cause the computing platform to:

establish a third connection, different from the established connection and the second connection, with the user computing device of the enterprise organization different from the computing platform, the external storage receiving device, and the internal entity computing system, wherein the third connection includes at least one firewall.

8. The computing platform of claim 7, wherein transmitting the files of the plurality of files having the first cybersecurity status to the user computing device associated with the enterprise organization for further processing is performed through the third connection.

9. A method, comprising:

establishing, by a computing platform, the computing platform having at least one processor and memory, a connection with a secure external storage receiving device located remotely from the computing platform;

receiving, by the at least one processor and from the secure external storage receiving device, an indication that an external storage device storing a plurality of files has been connected to a port of the secure external storage receiving device, wherein receiving the indication; causes the computing platform to generate commands causing the external storage receiving device to execute one or more functions the one or more functions including, replicating data associated with the external storage device, and encrypting the replicated data;

transmitting, by the at least one processor, the generated commands to the external storage receiving device;

receiving, by the at least one processor and via an Internet Protocol (IP) secure (IPsec) tunnel provided via the established connection, the encrypted replicated data from the external storage device via the external storage receiving device;

decrypting, by the at least one processor, the encrypted replicated data;

extracting, by the at least one processor and from the decrypted replicated data, the plurality of files;

executing, by the at least one processor and on each file of the plurality of files, a scan to determine a cybersecurity status of each file;

determining, by the at least one processor and based on the scan, the cybersecurity status of each file;

transferring, by the at least one processor and to a first output folder of the computing platform, all files of the plurality of files having a first cybersecurity status;

transmitting, by the at least one processor and to a user computing device associated with an enterprise organization, the files of the plurality of files having the first cybersecurity status for further processing including at least one of: identifying a source of a file, determining whether remediation of a file is available, identifying additional mitigation actions to execute, or identifying a type of malware; and transferring, by the at least one processor and to a second output folder of the computing platform different from the first output folder, all files of the plurality of files having a second cybersecurity status.

10. The method of claim 9, wherein the external storage device is physically connected to the external storage receiving device.

11. The method of claim 9, wherein the external storage device is a universal serial bus storage device.

12. The method of claim 9, wherein the replicated data is received by a content secure area of the computing platform.

13. The method of claim 9, further including:

transmitting, by the at least one processor, the files of the plurality of files having the second cybersecurity status to an internal entity computing system of an enterprise organization.

14. One or more non-transitory computer-readable media storing instructions that, when executed by a computing platform comprising at least one processor, memory, and a communication interface, cause the computing platform to:

establish a connection with a secure external storage receiving device located remotely from the computing platform;

receive, from the secure external storage receiving device, an indication that an external storage device storing a plurality of files has been connected to a port of the secure external storage receiving device, wherein receiving the indication, causes the computing platform to generate commands causing the external storage receiving device to execute one or more functions, the one or more functions including replicating data associated with the external storage device and encrypting the replicated data;

transmit the generated commands to the external storage receiving device;

receive, via an Internet Protocol (IP) secure (IPsec) tunnel provided via the established connection, the encrypted replicated data from the external storage device via the external storage receiving device;

decrypt the encrypted replicated data;

extract, from the decrypted replicated data, the plurality of files;

execute, on each file of the plurality of files, a scan to determine a cybersecurity status of each file;

determine, based on the scan, the cybersecurity status of each file;

transfer, to a first output folder of the computing platform, all files of the plurality of files having a first cybersecurity status;

transmit, to a user computing device associated with an enterprise organization, the files of the plurality of files having the first cybersecurity status for further processing including at least one of: identifying a source of a file, determining whether remediation of a file is available, identifying additional mitigation actions to execute, or identifying a type of malware; and transfer, to a second output folder of the computing platform different from the first output folder, all files of the plurality of files having a second cybersecurity status.

15. The one or more non-transitory computer-readable media of claim 14, wherein the external storage device is physically connected to the external storage receiving device.

16. The one or more non-transitory computer-readable media of claim 14, wherein the external storage device is a universal serial bus storage device.

17. The one or more non-transitory computer-readable media of claim 14, wherein the replicated data is received by a content secure area of the computing platform.

18. The one or more non-transitory computer-readable media of claim 14, further including instructions that, when executed, cause the computing platform to:

transmit the files of the plurality of files having the second cybersecurity status to an internal entity computing system of an enterprise organization.

* * * * *